United States Patent [19]

Saghatchi et al.

[11] Patent Number: 4,883,355

[45] Date of Patent: Nov. 28, 1989

[54] SLOTTED THRUSTERS FOR FLUID PROPELLED BORESCOPES

[75] Inventors: Hamid Saghatchi, Burbank; Geoffrey L. Taylor, Valencia, both of Calif.

[73] Assignee: Welch Allyn, Inc., Skaneateles Falls, N.Y.

[21] Appl. No.: 92,669

[22] Filed: Sep. 3, 1987

[51] Int. Cl.$^4$ ............................................. G01N 21/88
[52] U.S. Cl. ................................... 356/241; 350/96.26
[58] Field of Search ....................... 356/241; 128/4, 6; 350/96.26

[56] References Cited

U.S. PATENT DOCUMENTS 4,735,501  4/1988  Ginsburgh et al. ................. 356/241

Primary Examiner—Vincent P. McGraw
Assistant Examiner—S. A. Turner

[57] ABSTRACT

An improved thruster for propelling borescopes by the reaction forces generated by pressurized fluid expelled from the thruster has a desirably small cross-sectional profile made possible by its novel construction. The basic embodiment of the thruster comprises an elongated hollow cylinder sealed at one end by a bulkhead and supplied with pressurized fluid at the opposite, open end. A thin slot cut through the cylinder wall permits pressurized fluid to exit the hollow interior space of the cylinder, producing a reaction force useful in propelling a borescope tip to which the thruster is fastenable.

31 Claims, 4 Drawing Sheets

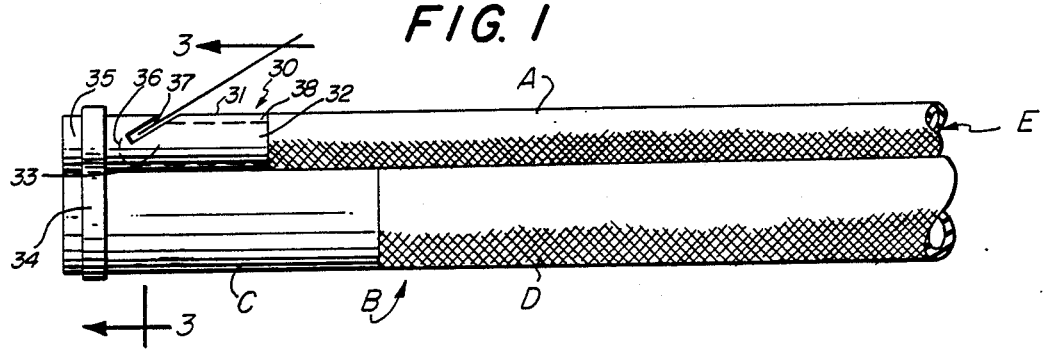
FIG. 1
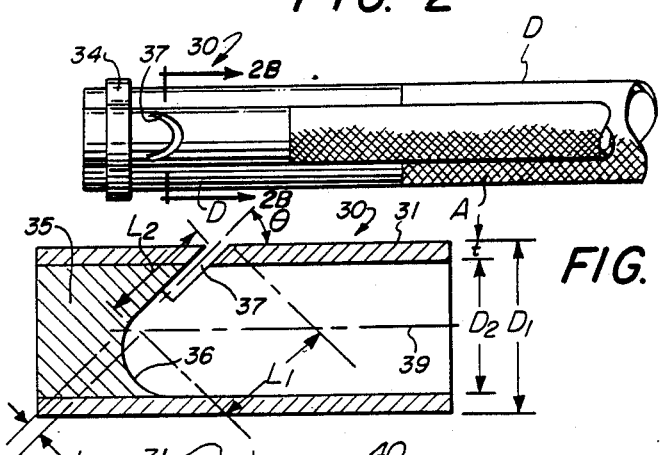
FIG. 2
FIG. 2A
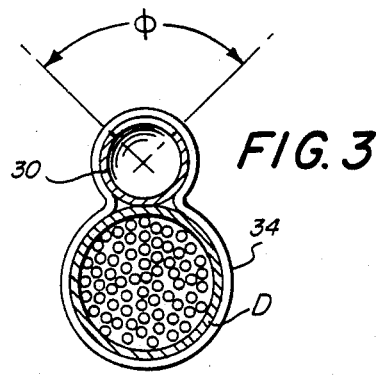
FIG. 3
FIG. 2B
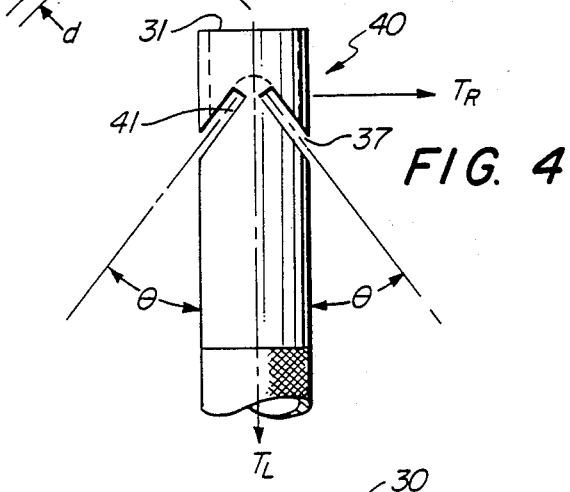
FIG. 4
FIG. 6
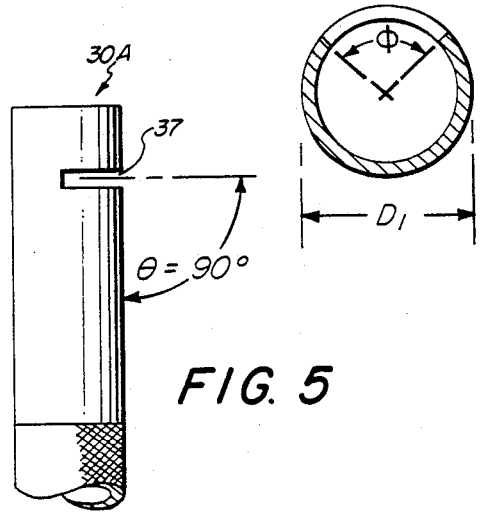
FIG. 5
FIG. 7

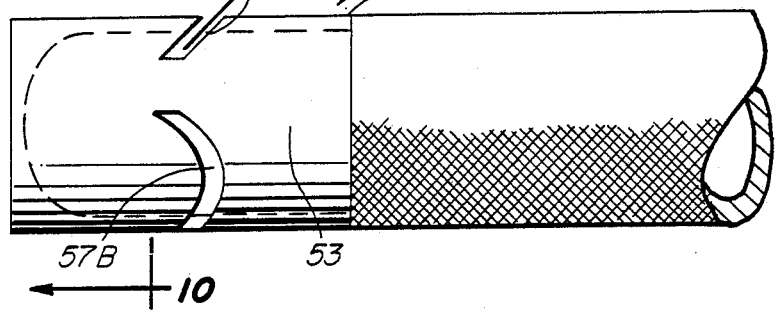
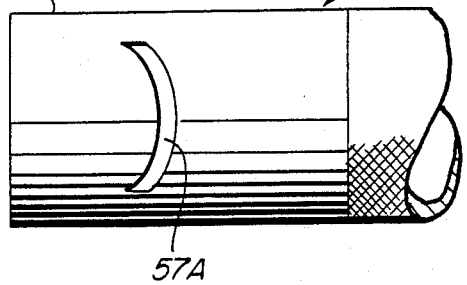
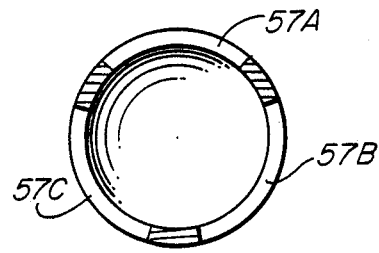
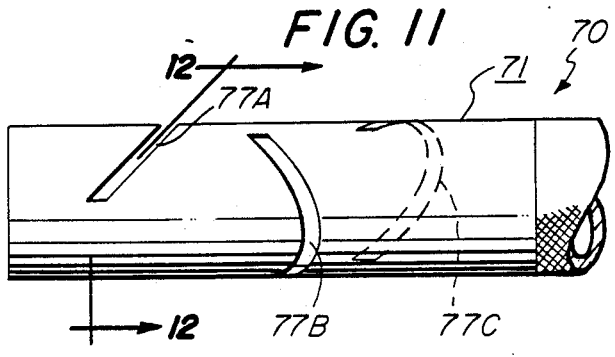
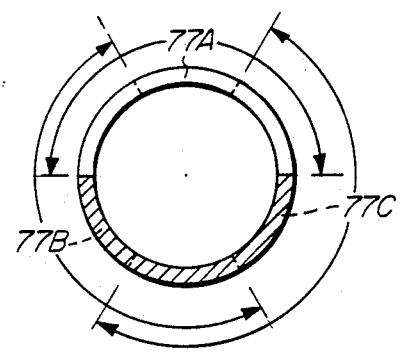
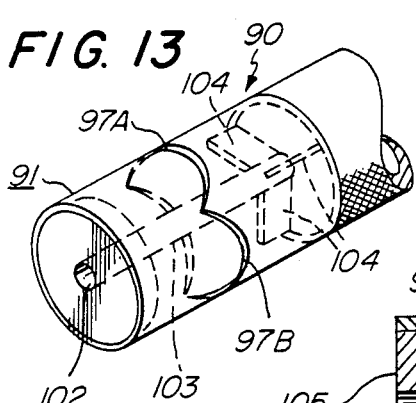
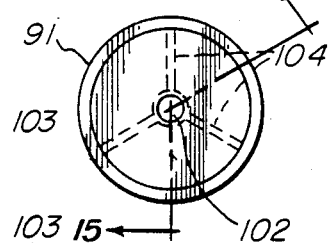
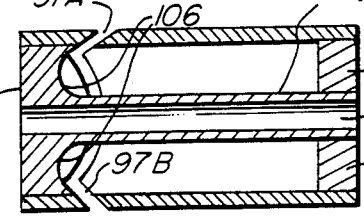

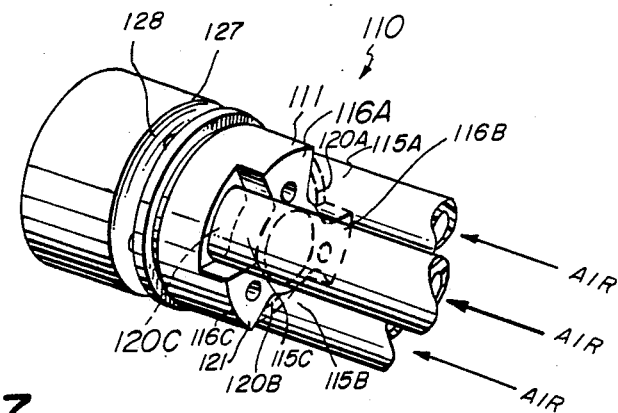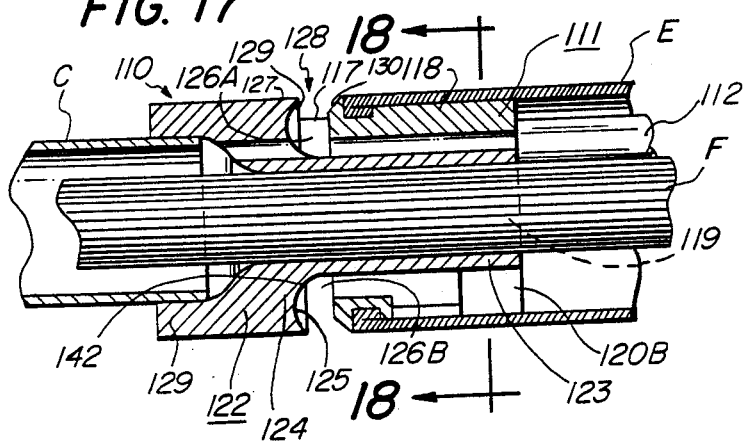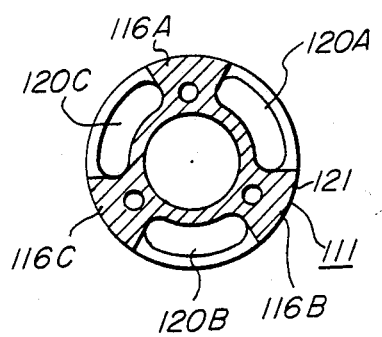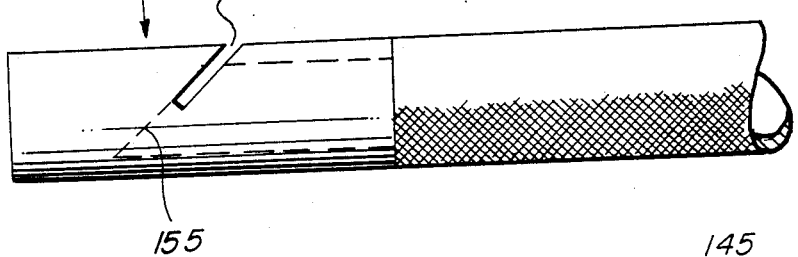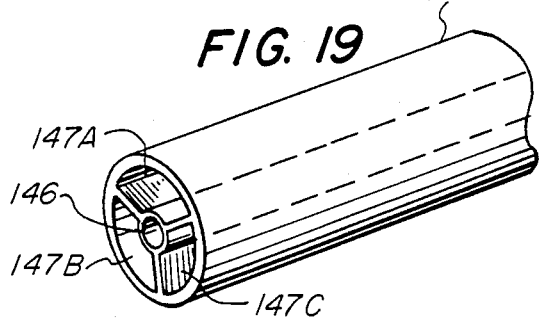

SLOTTED THRUSTERS FOR FLUID PROPELLED BORESCOPES

BACKGROUND OF THE INVENTION

A. Field of the Invention

The present invention relates to methods and apparatus for propelling flexible borescopes. More particularly, the invention relates to devices for propelling borescope heads by reaction forces generated in response to fluid expelled from jet thrusters.

B. Discussion of Background Art

In a co-pending U.S. Pat. application, Ser. No. 854,295, filed Apr. 21, 1986, and assigned to the same assignee as the present application, a novel and highly effective method and apparatus for propelling borescopes was disclosed. The apparatus disclosed in that co-pending application uses one or more reaction jets attached to the head of a flexible borescope to propel and guide the borescope head to inaccessible locations which it is desired to view. Each jet is powered by compressed air or other pressurized fluid, supplied to the jet by a flexible tube running back alongside or through the borescope cable to an external source of pressurized fluid. The basic embodiment of the invention disclosed in the above-identified application uses at least one rearward directed reaction jet to propel in a forward direction the borescope head to which the jet is attached.

Our continued testing of various embodiments of fluid propelled borescopes employing the teachings of the above-identified co-pending application have proven that the novel methods and apparatus disclosed therein are highly effective. In addition to the vast improvement in the speed and accuracy with which flexible borescope tips could be guided through complex machines such as jet turbine engines, we have discovered further advantageous features of our fluid propelled borescopes. For example, we found that under certain conditions, the rearward directed stream of propelling fluid flowing along the borescope tip and cable tends to adhere to the surfaces of the tip and cable, because of a boundary layer effect. Moreover, this boundary layer of fluid caused the tip and cable to tend to adhere to adjacent walls of passages through which the cable and tip were guided, because of the Bernoulli effect. In fact, the fluid flow could be adjusted so that the borescope head and a portion of the cable trailing behind the head could even be adhered to the ceiling of a structure, the Bernoulli force counteracting the force of gravity.

The jet tubes or thrusters disclosed in the above-identified co-pending application and tested by us have the general shape of a small tube bent into the shape of a hairpin. One end of the tube is connected to a flexible hose providing pressurized fluid to the thruster. The other end of the tube is directed generally rearward, or in a desired thrust direction, and typically has a tapered, narrowing orifice to increase the velocity of expelled fluid.

Thrusters having the general shape of a small diameter tube bent into a doubled-back, hairpin curve or U-tube shape as described above, were found to be highly effective for their intended purpose. However, an inherent limitation of the U-tube thruster is its relatively large cross-sectional profile. Since borescopes are often used in applications requiring them to be threaded through narrow and labyrinthine passageways, reduction of the cross-sectional profile of thrusters used with fluid propelled borescopes would be highly desirable. With that and other considerations as a motivating factor, the present invention was conceived of.

OBJECTS OF THE INVENTION

An object of the present invention is to provide a thruster for fluid propelled borescopes having a small cross-sectional area.

Another object of the invention is to provide a thruster for fluid propelled borescopes which may be incorporated into the structure of an existing borescope cable and tip without requiring an increase in the cross-sectional area of the assembly.

Another object of the invention is to provide a reduced cross-sectional area thruster for fluid propelled borescopes having a plurality of selectable thrust directions.

Another object of the invention is to provide a thruster for fluid propelled borescopes having a reduced cross-sectional area and a plurality of discrete thrust exhaust ports which are coupled to one another to improve stability of propulsion and guidance of the borescope head.

Various other objects and advantages of the present invention, and its most novel features, will be particularly pointed out in this disclosure.

It is to be understood that although the invention disclosed herein is fully capable of achieving the objects and providing the advantages mentioned, the structural and operational characteristics of the invention described herein are merely illustrative of the preferred embodiments. Accordingly, we do not intend that the scope of our exclusive rights and privileges in the invention be limited to the details of construction and operation described. We do intend that equivalents, adaptations and modifications which may be reasonably construed to employ the novel concepts of the invention described herein be included within the scope of the invention as defined by the appended claims.

SUMMARY OF THE INVENTION

Briefly stated, the present invention comprehends an improved thruster for providing a propulsion force to the head of a flexible borescope in reaction to fluid expelled from the thruster.

A basic embodiment of the novel thruster according to the present invention includes an elongated cylinder connected at a rear open end to a source of pressurized fluid. The cylinder is sealed at its front end by an internally concave, generally hemispherically-shaped bulkhead. A thin slot of generally uniform thickness is cut downwards through the upper sidewall of the cylinder, at a longitudinal location intermediate the rear opening and front bulkhead of the cylinder. The cutting plane of the slot is preferably perpendicular to the sides of the cylinder, as viewed from above. In side elevation view, the dihedral angle between the cutting plane of the slot and the rearward directed longitudinal axis of the cylinder is an acute angle, typically 30° to 45°. A slot cut as specified has in upper plan view a crescent shape, with a rearward directed vertex.

Fluid under pressure conducted into the interior of the thruster impacts the concave interior surface of the bulkhead, and rebounds to flow back through the interior of the cylinder towards the slot entrance. Fluid exiting the slot from the interior of the cylinder through the slot has rearward and radially outward flow direction components which provide forward and radially inward reaction force components. These reaction force components provide propulsive thrust to a borescope tip to which the thruster is attached.

BRIEF DESCRIPTION OF THE DRAWINGS

FIG. 1 is a side elevation view of a slotted thruster for fluid propelled borescopes according to the present invention, showing an attached flexible tube for providing pressurized fluid to the thruster, and showing the thruster attached to a borescope tip which it is intended to propel.

FIG. 2 is an upper plan view of the thruster of FIG. 1

FIG. 2A is an enlarged longitudinal sectional view of the thruster of FIG. 2.

FIG. 2B is a transverse sectional view of the device of FIG. 2B, taken along lines 2B—2B.

FIG. 3 is a rear transverse sectional view of the thruster of FIG. 1, taken along line 3—3.

FIG. 4 is a side elevation view of a thruster similar to the one shown in FIG. 1, but having a second propulsion slot.

FIG. 5 is a side elevation view of a modification of the thruster of FIG. 1, showing a 90-degree slot dihedral angle.

FIG. 6 is a side elevation view of a modification of the thruster of FIG. 1 showing a 45-degree slot dihedral angle.

FIG. 7 is a side elevation view of the thruster of FIG. 1 showing a 30-degree slot dihedral angle.

FIG. 8 is a side elevation view of a second embodiment of a slotted thruster according to the present invention.

FIG. 9 is an upper plan view of the thruster of FIG. 8.

FIG. 10 is a rear end view of the thruster of FIG. 8.

FIG. 11 is a side elevation view of a third embodiment of a slotted thruster according to the present invention.

FIG. 12 is a rear end view of the thruster of FIG. 11.

FIG. 13 is a perspective view of a fourth embodiment of a slotted thruster according to the present invention.

FIG. 14 is a rear end view of the thruster of FIG. 13.

FIG. 15 is a longitudinal sectional view of the thruster of FIG. 14, taken along the line 15—15 of that Figure.

FIG. 16 is a perspective view of a fiber optic borescope head and an attached omnidirectional thruster comprising a fifth embodiment of a novel thruster according to the present invention.

FIG. 17 is a transverse sectional view of the thruster of FIG. 16, taken along line 17—17.

FIG. 18 is a longitudinal sectional view of the thruster of FIG. 16, taken along line 18—18.

FIG. 19 is a transverse cross-sectional view of a flexible tube suitable for use with the thruster of FIGS. 16–18.

FIG. 20 is a side elevation view of a modification of the thruster shown in FIG. 1.

DESCRIPTION OF THE PREFERRED EMBODIMENTS

Figure 21:
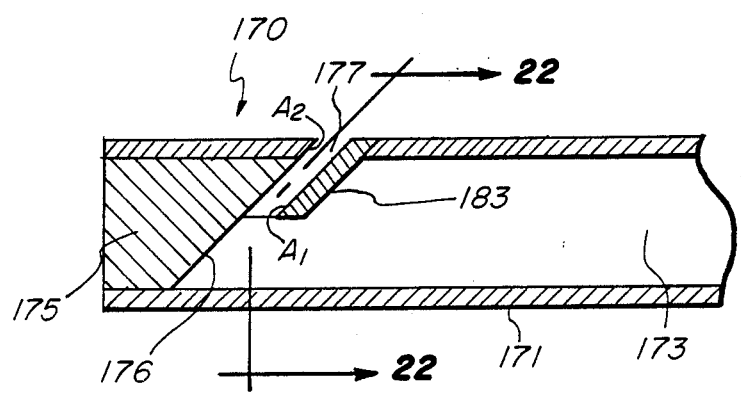
FIG. 21 is a longitudinal sectional view of a sixth embodiment of a slotted thruster according to the present invention.

A basic embodiment of a slotted thruster 30 for a fluid propelled borescope is shown in FIGS. 1 through 3. As shown in FIGS. 1 through 3, the slotted thruster 30 includes an elongated cylindrical body 31 having a rear circular opening 32 adapted to sealingly attach to a hollow flexible tube A which can convey pressurized fluid from an external source to the hollow interior space 33 of the cylindrical body.

As shown in FIG. 1, the slotted thruster 30 is adapted to attach to the cylindrical head of a flexible inspection borescope B having a flexible cable D. The slotted thruster 30 is preferably attached with its lower circumferential surface tangent to the outer circumferential surface of the borescope head C, with the longitudinal axis of the cylindrical body 31 of the thruster in parallel alignment with the longitudinal axis of the borescope D.

As shown in FIGS. 1–3, clamping bands 34 made of metal straps bent into a FIG. 8 cross-sectional shape may be used to hold the cylindrical body 31 of the thruster in tangent contact with the cylindrical body of the borescope head D. However, any other suitable means may be used to hold the slotted thruster 30 fixedly to the borescope B.

Referring now to FIGS. 1–3, it may be seen that cylindrical body 31 of the slotted thruster 30 is sealed at its front end by a circular transverse cross-section bulkhead 35. As may be seen best by referring to FIGS. 1 and 2, the bulkhead 35 has an arcuate, concave rear surface 36 facing the hollow interior space 33 of the cylindrical body 31 of the thruster.

As may be seen best by referring to FIG. 1, a thin slot 37 of generally uniform thickness is cut through the cylindrical wall 38 of the cylindrical body 31, at a location longitudinally intermediate bulkhead 35 and rear opening 32 of the cylindrical body. The center or cutting symmetry plane of the slot 37 is preferably perpendicular to the opposite longitudinal sides of the cylindrical body 31, as viewed from above, as shown in FIG. 2.

In side elevation view, FIG. 2A, the center or cutting symmetry plane of the slot 37 is shown to make a dihedral angle $\theta$ with the rearward directed longitudinal axis 39 of the cylindrical body 31. Angle $\theta$ is an acute angle, i.e., lying between 0° and 90°. In the embodiment shown in FIGS. 1–3, dihedral angle $\theta$ is 45°.

As may be seen best by referring to FIG. 2A, the slot 37 has in side view a rear penetration depth or wall length L1, a front penetration depth or wall length L2, and a thickness d. Also, the cylindrical body 31 has an outer diameter D1, and inner diameter D2, and a wall thickness t equal to one-half the difference between D1 and D2. The importance of each of these dimensions is discussed in detail below.

Referring now to FIG. 3, the slot 37 is seen to have a circumferential arc length subtending a sector angle $\phi$ on the longitudinal axis 40 of the cylindrical body 31. In the embodiment shown in FIGS. 1–3, sector angle $\phi$ is 90°.

As may be seen best by referring to FIG. 2, a slot 37 cut as specified above has in plan view the shape of a crescent with a rearward directed vertex.

The slotted thruster 30 functions as follows. Gaseous or liquid fluid E from an external source not shown is introduced into a rear opening of the hollow flexible tube A travels forward through the rear opening 32 of the cylindrical body 31A and travels forward through the hollow interior space 33 of the cylindrical body. Upon impacting the concave rear surface 36 of the bulkhead 35, the fluid rebounds back towards the slot 37 and enters the slot. Fluid exiting from the hollow interior space 33 of the cylindrical body 31 out through the slot 37 to the exterior of the cylindrical body has both rearward and radially outward flow direction components. In response to these flow components, forward and radially inward reaction thrust components, respectively, are generated. The magnitude of these reaction thrust components is controllable by controlling the pressure of the external source of pressurized fluid. Thus, by controlling the pressure of fluid supplied to the slotted thruster 30, the attached flexible borescope B may be propelled at a desired velocity.

In one application of the novel slotted thruster 30 according to the present invention, the thruster is attached to the underside of a flexible borescope B, with the opening of slot 37 directed downward and rearward, rather than upward and rearward With this relative orientation between the thruster and the borescope, the upward directed reaction thrust component may be used to raise the borescope head against the force of gravity, facilitating the use of the forward directed reaction thrust component to propel the borescope forward.

FIGS. 2A, 2B and 3 illustrate various dimensions of our thrusters which we have found to be of particular importance in controlling the effectiveness of thrust produced by the devices FIG. 2A is a longitudinal sectional view of a typical thruster, in this case, one having a single slot. FIG. 2B is a transverse front sectional view of the thruster 30 of FIGS. 1 and 2. FIG. 3 is a partially transverse and partially oblique rear sectional view of the thruster 30 of FIGS. 1–2.

As shown in FIGS. 2A and 2B, the outer diameter of the tube from which the thruster 30 is fabricated is D2, the inner diameter of the tube is D1, and the mean diameter is given by $D=(D1+D2)/2$. The wall thickness of the tube is t, which is also equal to $(D1-D2)/2$. In the figures, the thickness of the slot is d, and the dihedral angle between the longitudinal axis of the tube and center of the slot cutting plane is given by $\theta$. As shown in FIG. 2B, the sector angle of the slot is given by $\phi$.

As shown in FIG. 2, the slot in upper plan view has the shape of a crescent with a rearward directed vertex. We have found that an important ratio in evaluating thrust performance is the ratio between the area of the rear or lower crescent shaped slot wall, to the cross-sectional area of fluid discharged through the slot.

The lower wetted, or fluid contact area, of the discharge orifice of the thruster is given by:

$$A1=(t/\sin\theta)(D/2)\phi \qquad \text{(eqn.1.)}$$

The cross-sectional area of fluid being discharged through the slot orifice is given by:

$$A2=d(D/2)\phi \qquad \text{(eqn.2)}.$$

Thus, the ratio of A1 to A2 is given by:

In eqn. 3, $\theta$ is a parameter which determines the direction of discharge flow through the thruster slot, and therefore, of thrust direction. Typically, $\theta$ ranges between 30 degrees and 90 degrees. For this range of $\theta$, we have found that the ratio of t to d must have a minimum value of approximately 1.0 to 1.5. For ratios less than this value, fluid discharged from the slot orifice tends to diverge in an uncontrolled fashion, rather than flowing in the desired direction at which the slot dihedral angle is cut.

FIG. 4 illustrates a second embodiment of a slotted thruster according to the present invention. The thruster 40 shown in FIG. 4 is similar to the basic embodiment shown in FIGS. 1–3. However, the thruster 40 has a second slot 41 which is the mirror image of slot 37, as viewed through a longitudinal bisecting plane of elongated cylindrical body 31. The radial and longitudinal thrust components produced by fluid expelled through slot 37 having a magnitude T are given by:

$$T_R=T \sin\theta$$

$$T_L=T \cos\theta$$

For slot 40, the corresponding components of thrust in the same coordinate system is:

$$T_R=T \sin(-\theta)=-T \sin\theta$$

$$T_L=T \cos(-\theta)=T \cos\theta$$

Thus, the sum of the thrusts produced in the longitudinal direction is 2T, while the resultant radial thrust is zero. Accordingly, the thruster 40 shown in FIG. 4 is useful when it is desired to produce only a longitudinal thrust force on a borescope head.

FIGS. 5 through 7 illustrate various embodiments of the slotted thruster 30 of FIGS. 1 through 3, having different values of the dihedral angle 8 between the slot center plane and the longitudinal axis of the cylindrical body of the thruster. In the embodiment 30A, shown in FIG. 5, the dihedral angle $\theta$ is 90°, resulting in a thrust having solely a radially inwardly directed component. This embodiment would be useful in applications requiring the levitation of borescope heads and/or cables, and can be used in combination with other thrusters which provide longitudinal thrust components.

FIG. 6 illustrates the basic embodiment 30 of a thruster previously described, in which the dihedral angle $\theta$ is 45°, resulting in both radially inward and longitudinally forward thrust components.

FIG. 7 illustrates a third embodiment 30B of a slotted thruster according to the present invention. In that embodiment, the dihedral angle $\theta$ is 30°. It might be expected that a dihedral angle of 30° should result in a ratio of radial to longitudinal thrust components given by the sine of 30° to the cosine of 30°, or 0.577. However, we have found that for dihedral angles of 30° or less, gaseous fluid exiting from slot 37 tends to adhere to the outer cylindrical wall of the cylindrical body 31 of the thruster 30. Thus, for dihedral angles of 30° or less, the thrust produced by thruster 30 is substantially longitudinally directed. Accordingly, the dihedral slot angle $\theta$ need not be less than 30°.

A second embodiment of a slotted thruster according to the present invention is shown in FIGS. 8 through 10. The thruster 50 shown in FIGS. 8 through 10 is similar in construction and operation to the basic embodiment previously discussed. However, the thruster 50 contains a plurality of crescent-shaped slots 57 through the cylindrical body 51 of the thruster, rather than the single slot contained in the basic embodiment. As may be seen best in FIG. 10, slots 57A, 57B, 57C are spaced at regular circumferential angles around the longitudinal axis 60 of the body 51 of the thruster. In the example embodiment shown in FIG. 10, each slot 57A, 57B, and 57C subtends an identical sector angle $\phi$. For three equi-spaced slots 57A, 57B and 57C, the circumferential angle between the perpendicular bisector of each slot is 120°.

Because of the identical shape and size of slots 57A, 57B and 57C, and their placement at equal polar angles with respect to the longitudinal axis 40 of the cylindrical body 51 of the thruster 50, pressurized fluid within the hollow interior space 53 of the thruster exits the slots at equal mass flow rates. Accordingly, the radial inward reaction forces produced in response to fluid exiting the slots counter balance one another, producing a net radial thrust of zero. Thus, the net reaction force produced by the thruster 50 lies entirely along the longitudinal axis of the thruster, in a forward direction.

In the second embodiment 50 of the slotted thruster shown in FIGS. 8 through 10, the sector angle of each slot 57A, 57B and 57C is shown to be 90°. Thus, the polar angle between adjacent slot edges is $(360° - 3 \times 90°)/3 = 30°$. From the above equation, it is clear that the maximum sector angle of three equal-angle slots is 120°. Of course, the actual maximum width of slots so positioned at the same transverse plane of a thruster must be somewhat less than 120°, to allow a finite width of supporting wall between adjacent slots. Sometimes larger sector angles are desired because they result in a larger fluid flow cross-section, and therefore produce greater thrust. In such cases, a third embodiment of the slotted thruster according to the present invention may be employed.

In a third embodiment 70 of the slotted thruster shown in FIGS. 11 and 12, a plurality of slots 77 is cut through the cylindrical wall 78 of an elongated cylindrical body 71 of the thruster 70. Each slot 77 is cut at a different longitudinal position along the length of the cylindrical body 71 of the thruster Thus, a first slot 77A is cut such that the cutting or symmetry plane of the slot intersects the longitudinal axis 80 of the cylindrical body 71 a short distance back from the bulkhead 76 of the thruster. A second slot 77B is cut such that its symmetry or cutting plane intersects the longitudinal axis a greater distance from the bulkhead, and a third slot 77C is cut at a still greater distance from the bulkhead. This staggered arrangement of slots permits the sector angle of each slot to be larger than possible with all slots positioned at the same longitudinal position. As was described above, the maximum practical sector angle for each of three slots in the latter configuration is less than 120 degrees. By way of contrast, the staggered placement of slots permits substantially larger sector angles. Thus, in the particular example of the staggered embodiment shown in FIGS. 11 and 12, three identical, staggered slots making a 45 degree dihedral angle with the longitudinal axis of the thruster each has a sector angle of 180 degrees.

A fourth embodiment of a slotted thruster according to the present invention is shown in FIGS. 13 through 15. In the embodiment 90 shown in those figures, three slots 97A, 97B and 97C each having a sector angle of 120° are located in the same longitudinal position along the longitudinal axis 100 of an elongated cylindrical body 91. This is made possible by the provision of a central body 102 coaxially contained within the cylindrical body 91.

As shown in FIG. 13–15, the central body 102 has an elongated stem 103 which extends forward from the rear opening 92 of the cylindrical body 91 into the shallow cylindrical interior space 93 of the body, in coaxial alignment with the cylindrical walls of the body. The rear end of the stem 103 may be held in concentric alignment with the cylindrical body by any suitable means. In the embodiment shown in the figures, vanes 104 radiating outward from the rear portion of the stem contact the inner cylindrical walls of cylindrical body 91 to maintain concentricity therewith.

The forward end of stem 103 of the central body 102 has an enlarged cylindrical head 105. Head 105 has a circular transverse cross-section. The outer diameter of head 105 is of the proper size to make a snug, fluid-tight peripheral seal with the inner circumferential surface of the forward end of the cylindrical body 91.

As may be seen best by referring to FIG. 15, the rear surface 106 of head 105 is concave. Thus, the general appearance of central body 102 alone would be that of a mushroom.

As shown in FIGS. 13 and 15, the slots 97A, 97B and 97C are cut into the cylindrical wall 98 of the cylindrical body 91, with the forward edge of each slot tangent to the outer edge of the concave rear surface 106 of head 105. Since the parts of the cylindrical body 91 forward and rearward of the slots 97 are both secured to the central body 102, the slots may form a continuous annular gap between the front and rear parts of the cylindrical body, if desired. Thus, in a modification of the thruster shown in FIGS. 13 through 15, a continuous bevelled cut may be made circumferentially in places of the individual slots 97A, 97B and 97C.

A fifth embodiment of a slotted thruster according to the present invention is illustrated in FIGS. 16 through 18. In the embodiment 110 shown in those figures, compressed air or other pressurized fluid is supplied by three separate tubes to three separate thrust-producing slots spaced at 120° from one another By selectively varying the flow rate of pressurized fluid to each of the three slots, the resultant thrust force vector may be positioned anywhere within a 360° circle circumscribingthe thruster. A mixing chamber is also provided in thruster 110, resulting in some cross coupling between pressurized fluid intended primarily for a particular slot, to provide greater stability in propelling the thruster, as will be described in greater detail below.

The thruster 110 shown in FIGS. 16 through 18 is adapted to fit behind the tip C of a flexible borescope B, coaxially aligned with the tip and a modified flexible borescope cable E trailing behind the borescope tip. As shown in FIG. 16, the modified flexible borescope cable E includes the usual flexible core section F, containing a flexible fiber optic image conduit, or an electrical cable carrying video signals from a miniature solid state imaging device such as a CCD (charge coupled device) in the tip of the borescope. The modified cable E also contains a number of hollow flexible pressurized air supply tubes 112A, 112B and 112C, one for each thruster slot 117A, 117B, 117C cut through the cylindrical body 111 of the thruster 110.

As may be seen best by referring to FIGS. 16 and 18, the cylindrical thruster body 111 has a relatively thick inner cylindrical wall section 118 having a longitudinally disposed central inner bore 119 of generally uniform rear inner diameter which flares out to a larger inner diameter near the front end of the body. Central bore 119 is provided to permit signal transmission lines in flexible core section F of the cable E of borescope B to pass through the thruster 110, between the tip C and cable E of the borescope to which the thruster is attached. As may be seen best by referring to FIGS. 17 and 18, the thruster body 111 contains three longitudinally disposed channels 120A, 120B, 120C for supplying pressurized fluid, the channels extending forward from the rear face 121 of the cylindrical body 111. Channels 120A, 120B, 120C are spaced equidistant from the longitudinal center line of the cylindrical body 111, and are spaced at 120 degree circumferential angles with respect to one another. As shown in FIG. 16, radial notches 115A, 115B and 115C are cut forward from the rear face 121 of the thruster body 111, resulting in 3 radial bosses 116A, 116B and 116C spaced at 120 degree intervals, projecting from the rear of the body.

As may be seen best by referring to FIG. 17, the thruster body 111 has an elongated, hollow central portion 122 having a coaxial stem section 123 which extends forward from the rear face 121 of the thruster body. The forward end of stem section 123 has a circumferentially enlarged, cylindrical head 129. The rear surface 125 of head 124 is concave. Thus, the general appearance of the central portion 122 of thruster body 111 is that of a mushroom.

As shown in FIG. 17, each of the longitudinally disposed pressurized fluid flow supply channels 120A, 120B and 120C is terminated at its forward end by the rear surface 125 of head 124 of the central portion 122 of the thruster body 111. Thus, the channels 120A, 120B and 120C form with the rear surface 125 of the head 124, three separate chambers or plenums 126A, 126B and 126C.

The outer cylindrical wall 127 of thruster body 111 contains an annular groove 128 which is cut through the entire circumferential surface of the cylindrical wall. The longitudinal position of the groove 128 is slightly rearward of the concave rear surface 125 of the stem head 124.

The annular groove 128 has bevelled, parallel front and rear edges 129 and 130, respectively. The front edge 129 is substantially tangent to the rear concave surface 125 of stem head 124. Thus, groove 128 forms a separate crescent-shaped slot 117A, 117B and 117C, which communicates with a separate plenum 126A, 126B and 126C, respectively. Each slot is substantially identical in shape and size. Also, the symmetry plane of each slot has the same dihedral inclination with respect to the rearward directed longitudinal axis 140 of the cylindrical thruster body 111. This angle is an acute angle, typically 30 to 45 degrees.

Because of the 120 degree placement and equivalent shape and inclination of the slots 117A, 117B and 117C, equal mass flow rates of a pressurized fluid, such as air, supplied to separate plenum sections 126A, 126B and 126C by equally pressurized fluid supply channels 120A, 120B and 120C results in a resultant reaction thrust force vector on thruster 110 which lies along the longitudinal axis 140 of the thruster body 111. Thus, supplying pressurized fluid at the same pressure to the remote inlet bores 141 of each pressurized fluid supply channel 120 results in a forward directed thrust being produced by thruster 110, effective in moving borescope tip C and flexible borescope cable E forward.

By supplying fluid at different selectable pressures to supply channels 120A, 120B and 120C, the thrust produced by each thruster slot 117A, 117B and 117C may be differentially controlled. In this way, the direction of the resultant thrust vector may be varied, permitting the thruster 110 and attached flexible borescope to be propelled and steered to a desired remote location. This may be done by an operator at the near end of the cable selectably controlling the mass flow rate into each pressurized fluid supply channel 120.

The cylindrical body 111 of the thruster 110 shown in FIGS. 16 through 18 also contains a common plenum chamber 142 defined by the annular groove 128 and the rear surface 125 of stem head 124. The common plenum chamber 142 communicates with each of the separate plenum sections 126A, 126B and 126C via the annular groove 128. Thus, a fraction of the pressurized fluid supplied to a selected one of the separate plenum sections 126A, 126B and 126C passes through the common plenum chamber 142 into the other two separate plenum sections. This cross-coupling improves the stability of propelling and guiding the thruster 110, because sharp variations in any of the pressurized air supplies is cross-coupled and dampened somewhat, providing a more stable control of tip movement.

FIG. 19 illustrates a four section flexible tube 145 useful for suppling pressurizing fluid to thruster 110 and providing a central channel 146 for a flexible fiber optic or electrical cable F. Tube 145 includes air supply conduits 147A, 147B, and 147C, spaced circumferentially at 120 degree intervals.

As shown in FIG. 2A, the basic embodiment of the slotted thruster 30 has a front bulkhead 35 with a concave rear surface 36. The outer circumferential edge of the concave rear surface 36 is substantially tangent to the front edge of the slot 37. The purpose of the curved bulkhead and tangent slot is to minimize turbulence of pressurized fluid flowing into the plenum section and out through the slot, thereby maximizing the thrust produced by a given mass flow rate of fluid. We have found that for very small thrusters employing high mass flow rates of pressurized gas, turbulent flow is unavoidable. Accordingly, for thrusters operating in this turbulent regime, we have found a modified thruster to be useful. In the modified thruster 150 of the type shown in FIG. 20, front bulkhead 155 is a flat plane. A crescent-shaped slot 157 is cut through the cylindrical body of the thruster 150. The front surface of the slot 157 is coplanar with the rear surface 156 of the bulkhead 155. The thruster 150 is easier to fabricate than one having a curved bulkhead, and performs equally well for turbulent flow regimes.

Figure 22:
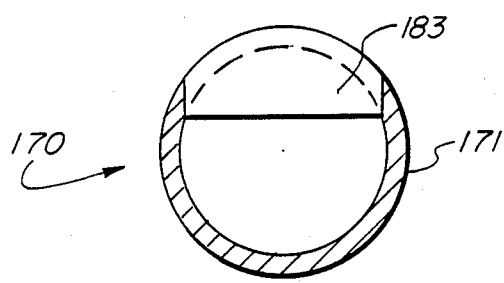
FIG. 22 is a transverse sectional view of the device of FIG. 21, taken along line 22—22.

FIGS. 21 and 22 illustrate a sixth embodiment of a slotted thruster according to the present invention. In the thruster 170 shown in FIGS. 21 and 22, a thin plate 183 is inserted into the thruster slot, parallel to the rear wall of the slot and fastened thereto. Since the wetted area A1 is increased substantially by the insertion of the plate, the slot width may be increased, while still maintaining a minimum ratio of A1/A2 of 1.0 to 1.5, the requirement for which was stated above. The increased fluid flow cross-sectional area A2 resulting from an increased slot width, permits a much larger flow rate, producing substantially more thrust.

Figure 23:
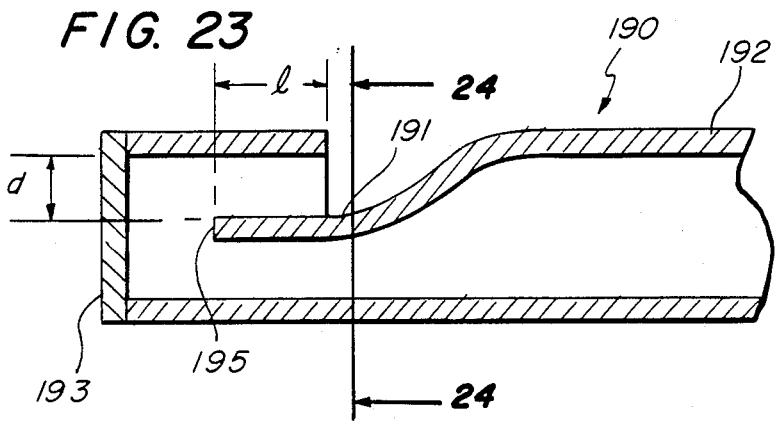
FIG. 23 is a longitudinal sectional view of a seventh embodiment of a thruster according to the present invention.
Figure 24:
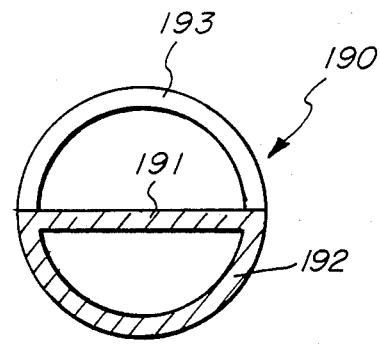
FIG. 24 is a transverse sectional view of the device of FIG. 23, taken along line 24—24.

FIGS. 23 and 24 illustrate a seventh embodiment of a slotted thruster according to the present invention. In the thruster 190 shown in FIGS. 23 and 24, a tapered half flat section 191 is formed in a cylindrical tube 192, as by compressing the tube, for example. A cylindrical cap 193 having the same diameter as the tube is then fastened coaxially to the end of the tube. The upper cylindrical wall 194 of the cylindrical cap 193 extends rearward a distance L beyond the front edge 195 of flattened half section 191 of tube 192. The vertical distance d between the lower surface of cap 193 and the upper surface of flattened half section 191 partly determines the cross-sectional area of fluid flowing out through the orifice defined between those two surfaces. We have found that a ratio of L to d of equal to or greater than 2.5 is required to effectively turn around fluid entering the thruster the desired 180 degrees to produce rearward directed flow, and forward directed reaction thrust.

What is claimed is:

1. A thruster adapted to attach to a borescope and to propel said borescope by the reaction force generated in response to pressurized fluid expelled from said thruster comprising:
   a. an elongated, generally straight and cylindrically shaped, hollow body having an entrance opening communicating with the hollow interior of said body,
   b. a bulkhead sealing an end of said body opposite said entrance opening,
   c. a narrow aperture through the cylindrical wall of said body, said aperture being located longitudinally between said entrance opening and said bulkhead, whereby pressurized fluid supplied to said hollow interior of said body through said entrance opening exits said hollow body through said narrow aperture, thereby producing a reaction thrust force on said thruster body.

2. The thruster of claim 1 wherein said narrow aperture is a generally uniform thickness slot cut through the cylindrical wall of said body.

3. The thruster of claim 2 wherein a symetry plane bisecting the thickness dimension of said slot is substantially perpendicular to parallel longitudinal surface elements of the cylindrical surface of said cylindrical body, but is inclined at a dihedral angle to the longitudinal axis of said cylindrical body.

4. The thruster of claim 3 wherein said bulkhead has a concave interior surface.

5. The thruster of claim 4 wherein one edge of said slot is substantially tangent to said concave interior surface of said bulkhead.

6. The thruster of claim 3 wherein said bulkhead has a rearward sloping planar surface.

7. The thruster of claim 6 wherein one edge of said slot is substantially co-planar with said rearward sloping planar surface.

8. The thruster of claim 1, wherein said generally cylindrically shaped body has a substantially cylindrical rear section containing said entrance opening, an intermediate section which tapers radially from a cylindrical rear portion continuous with said rear section to a flattened semi-cylindrical front end, and a cylindrical front cap section of substantially the same diameter as said cylindrical rear section coaxial with said rear section of said body, one semi-cylindrical wall of said cap section extending backwards some distance over the flattened semi-cylindrical front end of said intermediate section of said body, thereby forming a semi-cylindrical channel between the inner surface of said semi-cylindrical wall of said cap section and the outer surface of said flattened semi-cylindrical front end of said intermediate section of said body.

9. A thruster for borescopes comprising
   an elongated generally straight and cylindrically shaped hollow body having a rear opening adapted to sealing attachment to a source of pressurized fluid, said body being sealed at its front end by a bulkhead, and said body having cut through its cylindrical wall a thin aperature slot of generally uniform thickness, said slot having a front edge proximate said bulkhead and a rear edge rearward of said front edge, and said aperature slot communicating with the hollow interior of said hollow body.

10. The thruster of claim 9 wherein a symmetry plane bisecting the thickness dimension of said slot is substantially perpendicular to parallel longitudinal surface elements of the cylindrical surface of said hollow cylindrical body.

11. The thruster of claim 9 wherein a symmetry plane bisecting the thickness dimension of said slot forms an acute dihedral angle with the rearward directed longitudinal axis of said hollow cylindrical body.

12. The thruster of claim 11 wherein the depth of said slot is limited in the cutting direction such that the circumferential arc length of said slot subtends a sector angle on the longitudinal axis of said hollow cylindrical body of less than 180 degrees.

13. The thruster of claim 12 wherein said bulkhead has a concave rear surface.

14. The thruster of claim 13 wherein the cut cylindrical wall surface of said cylindrical body defining the front surface of said slot has substantially the same inclination with respect to the longitudinal axis of said hollow cylindrical body as does the outer peripheral edge of said concave surface of said bulkhead intersecting the inner cylindrical wall surface of said body.

15. The thruster of claim 14 wherein said cut cylindrical wall surface of said cylindrical body defining said front surface of said slot is substantially tangent to the said outer peripheral edge of said concave rear surface of said bulkhead.

16. The thruster of claim 12 further including a generally uniform thickness plate-like extension thinner than the width of said slot continuous with the rear edge of said slot, said plate-like extension having an inner portion which protrudes into the hollow interior of said body.

17. The thruster of claim 16 wherein the outer edge of said plate-like extension is contoured to conform with the outer circumferential wall surface of said hollow cylindrical body.

18. The thruster of claim 12 further including a second slot cut through the cylindrical wall of said elongated hollow cylindrical body in a position diametrically opposed to said first slot.

19. A thruster for borescopes comprising an elongated generally straight hollow cylindrical body having a rear opening adapted to sealing attachment to a source of pressurized fluid, said body being sealed at its front end by a bulkhead having a concave face adjacent the hollow interior space of said hollow cylindrical body, and said body having cut through the cylindrical wall of said body at least one thin, generally uniform thickness cross-section slot communicating with said hollow interior space of said hollow cylindrical body.

20. The thruster of claim 19 wherein a symmetry plane bisecting the thickness dimension of said slot forms an acute dihedral angle with the rearward directed longitudinal axis of said hollow cylindrical body.

21. The thruster of claim 20 wherein said slot has a circumferential arc length of less than 180 degrees, and further includes a second slot substantially identical in size and shape to said first slot, located 180 degrees circumferentially with respect to said first slot, in the same longitudinal position.

22. The thruster of claim 20 wherein said slot has a circumferential arc length of less than 120 degrees, and further includes second and third slots substantially identical in size and shape to said first slot, but located plus and minus 120 degrees circumferentially, respectively, with respect to said first slot, in the same longitudinal position.

23. The thruster of claim 20 further including a second slot similar to said first slot, said second slot located longitudinally rearward with respect to said first slot.

24. The thruster of claim 23 wherein said second slot is circumferentially displaced from said first slot.

25. The thruster of claim 24 further including a third slot similar to said first and second slots, said third slot located longitudinally rearward with respect to said first slot.

26. The thruster of claim 25 wherein said first, second and third slots are each substantially identical in size and shape, and are displaced 120 degrees circumferentially from one another.

27. A thruster for borescopes comprising:
 a. an elongated hollow cylindrical body having a rear opening adapted to sealing attachment to a source of pressurized fluid,
 b. an elongated central body disposed coaxially and longitudinally within the hollow interior space of said hollow cylindrical body, said central body having an elongated small diameter stem supported at its rear end in fixed coaxial relationship with said rear opening of said hollow cylindrical body, said stem having a circumferentially enlarged front head adapted to fit in fluid-tight sealing engagement with the inner circumferential wall surface of the front portion of said hollow cylindrical body, and
 c. at least one slot positioned longitudinally rearward of said enlarged head and communicating with the hollow interior space within said hollow cylindrical body.

28. The thruster of claim 27 wherein the rear surface of said enlarged head is concave.

29. The thruster of claim 28 further including second and third slots substantially identical in size and shape to said first slot, said second and third slots located at the same longitudinal location, but circumferentially displaced plus and minus 120 degrees, respectively, with respect to said first slot.

30. The thruster of claim 28 wherein said slot is a continuous annular aperture circumferentially encircling said cylindrical wall of said hollow cylindrical body, rearward of said enlarged head.

31. The thruster of claim 30 wherein said continuous annular slot is cut at a dihedral bevel angle with respect to the longitudinal axis of said hollow cylindrical body, thereby forming annular front and rear bevelled slot wall surfaces, said front slot wall surface being substantially tangent to said concave rear surface of said enlarged head.

* * * * *